(12) United States Patent
Liou (10) Patent No.: US 12,485,825 B2
(45) Date of Patent: Dec. 2, 2025

(54) CARGO BOX

(71) Applicant: Chuen-Shiuan Liou, Hsinchu (TW)

(72) Inventor: Chuen-Shiuan Liou, Hsinchu (TW)

( * ) Notice: Subject to any disclaimer, the term of this patent is extended or adjusted under 35 U.S.C. 154(b) by 469 days.

(21) Appl. No.: 18/122,632

(22) Filed: Mar. 16, 2023

(65) Prior Publication Data

US 2023/0382308 A1 Nov. 30, 2023

(30) Foreign Application Priority Data

May 31, 2022 (TW) .................................. 111120174

(51) Int. Cl.
*B60R 5/00* (2006.01)
*B60H 1/00* (2006.01)

(52) U.S. Cl.
CPC . *B60R 5/00* (2013.01); *B60H 1/00* (2013.01)

(58) Field of Classification Search
CPC ............ B60R 5/00; B60R 5/003; B60R 5/041
See application file for complete search history.

(56) References Cited

U.S. PATENT DOCUMENTS

| | | | | |
|---|---|---|---|---|
| 3,656,637 A | * | 4/1972 | Lynn | A61G 3/0209 414/921 |
| 5,096,361 A | * | 3/1992 | Crawford | A61G 3/0209 414/812 |
| 7,168,575 B2 | * | 1/2007 | Olsen, Jr. | B60R 5/00 211/21 |
| 8,182,011 B2 | * | 5/2012 | Suzuki | B60P 1/003 296/37.16 |
| 10,562,434 B2 | * | 2/2020 | Bizcarguenaga Ansola | B60R 5/00 |
| 10,603,531 B2 | * | 3/2020 | Lenz, Jr | B60R 5/003 |

* cited by examiner

*Primary Examiner* — Jonathan Snelting
(74) *Attorney, Agent, or Firm* — PENILLA IP, APC (57) ABSTRACT

A cargo box for transporting a cart having guiding rods includes a cargo box body for accommodating the cart; and a cargo box hatch that can be raised, lowered, opened, and closed. The cargo box body includes a first rail, and a liftable holder including a lift rod, a connecting rod, a branch portion, and at least one holding portion. The first rail is provided with a set of safety latches along a first direction, which hold the cart at a predetermined position on the first rail by restricting movement of the guiding rods on the first rail in the first direction.

13 Claims, 7 Drawing Sheets

CARGO BOX

CROSS REFERENCE TO RELATED APPLICATIONS

The present application claims priority from Taiwan Patent application No. TW 111120174 filed on May 31, 2022, entitled "CARGO BOX", the content of which is hereby incorporated by reference in their entirety for all purposes.

TECHNICAL FIELD

The present invention relates to a cargo box.

BACKGROUND

There have been techniques for transporting wheeled carts by trucks, such as loading the wheeled carts into a cargo box of a truck by using rails installed in the cargo box for transportation. However, when transporting with a conventional truck, vibrations and violent movement may occur due to road conditions, turning or braking, etc., which may cause vibration and collision of the carts carried in the cargo box. For this reason, a cargo box which is able to stabilize the cargo carried therein is required, in order to reduce the impact of vibration caused by, for example, road conditions and driving behavior on the cargo.

SUMMARY OF THE INVENTION

In view of the problem mentioned above, the objective of the present invention is to provide a cargo box, which can stably carry cargo therein and reduce the displacement of the cargo within the cargo box.

In an aspect of the present invention, a cargo box for transporting a cart having guiding rods comprises: a cargo box body configured to accommodate at least one cart; and a cargo box hatch disposed on a side of the cargo box body and connected to a bottom of the cargo box body, the cargo box hatch being able to be raised, lowered, opened, and closed, wherein the cargo box hatch provides, when opened, an access for the cart to be moved into and out of the cargo box body. The cargo box body comprises: a first rail extending along a first direction and disposed within the cargo box body and on the bottom of the cargo box body, the first rail being capable of accommodating the guiding rods, such that the cart is movable along the first direction; and a liftable holder comprising: lift rods extending in a second direction and disposed on both laterally opposite sides of the first rail; a connecting rod connected to the lift rods and being movable upwards and downwards along the lift rods; a branch portion disposed on the connecting rod; and one or more holding portions disposed on the branch portion and configured to contact a top surface of the cart when the connecting rod is lowered. The first rail is provided with at least one set of safety latches along the first direction. The at least one set of safety latches include two stoppers configured to hold the cart at a predetermined position on the first rail by restricting the movement of the guiding rods along the first rail in the first direction. A spacing between the two stoppers is determined based on a distance between the guiding rods located on front and rear ends of the cart.

DETAILED DESCRIPTION

The cargo box according to the present invention will be described below with reference to the drawings. The drawings are only illustrative schematic diagrams which may not be drawn to scale based on actual dimensions, and in which many details may be omitted. In addition, in order to provide a clear directional relationship, a first direction shown by the X-axis in FIG. 5, a second direction (Z-axis) perpendicular to the ground, and a third direction (Y-axis) perpendicular to the first direction and the second direction are defined.

The cargo box 1 of the present invention comprises a cargo box body 10 and a cargo box hatch 20. A space for accommodating cargo is formed within the interior of the cargo box body 10. The cargo box hatch 20 can be opened and closed. When closed, the cargo box hatch 20 defines the space for accommodating cargo. When the cargo box hatch 20 is opened, an access opening for loading and unloading cargo is formed. Details of the cargo box body 10 and the cargo box hatch 20 will be described in detail later. In an aspect of the present invention, the cargo box 1 is, for example, coupled to a truck and used to carry one or more wheeled carts C. For example, the cart C is a cuboid with wheels installed at four corners of the bottom thereof to facilitate the movement of the cart C. In an aspect of the present invention, the bottom of the cart C further comprises two guiding rods C1 located respectively on front and rear ends of the bottom of the cart C.

Figure 1:
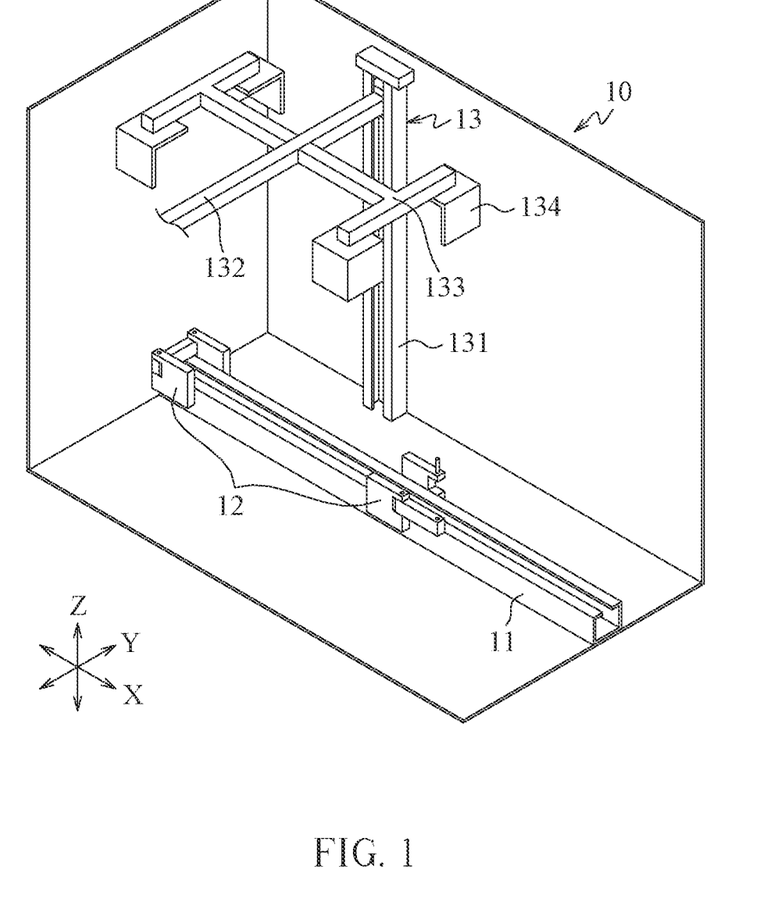
FIG. 1 is a schematic diagram of a cargo box body.
Figure 2A:
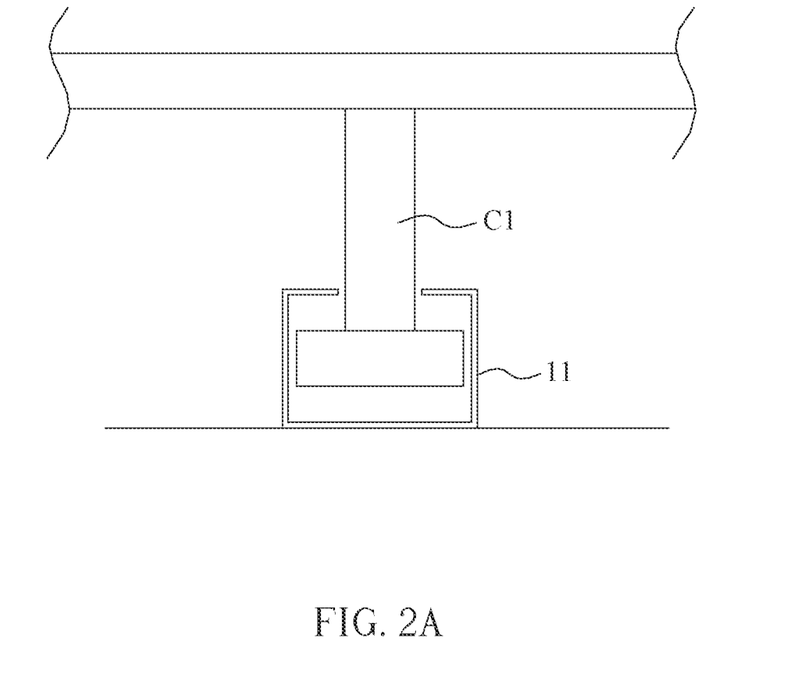
FIG. 2A is a schematic diagram of a first rail accommodating a guiding rod.

First, the cargo box body 10 of the cargo box 1 of the present invention is described. As shown in FIG. 1, the cargo box body 10 is formed as a hollow cuboid, so as to form a space for accommodating cargo. The inner bottom surface of the cargo box body 10 comprises at least one first rail 11 extending along the first direction and fixed to the inner bottom surface of the cargo box body 10 by way of welding or screws. As shown in FIG. 2A, the first rail 11 comprises a groove that opens upward, where the groove is formed to be capable of accommodating the shape and size of the guide rods C1 of the aforementioned cart C. With the guide rods C1 being held within the groove, the moving direction of the cart C can be limited to the extension direction of the first rail 11, i.e., the first direction. At least one first rail 11 is provided, although the number of the first rails 11 can be set according to the requirement of transportation.

Figure 2B:
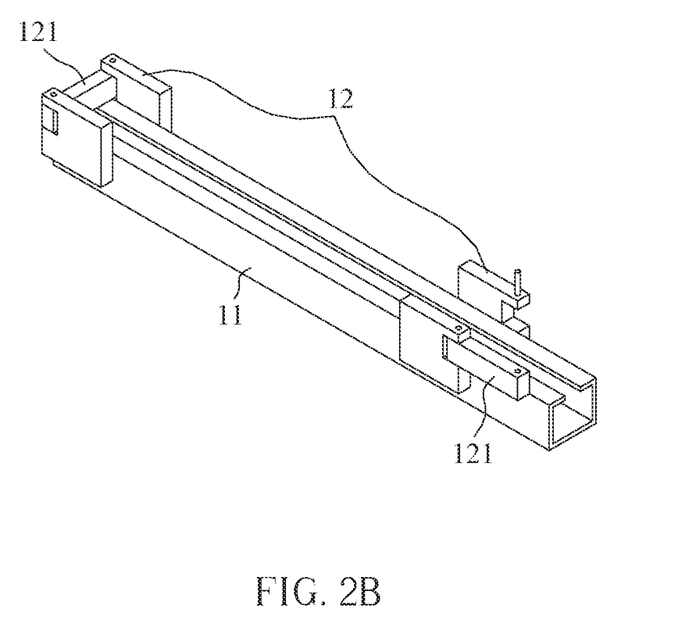
FIG. 2B is a schematic diagram of the first rail and safety latches.

The first rail 11 comprises at least one set of safety latches 12 (referring to FIG. 1). As shown in FIG. 2B, a set of safety latches 12 comprises two stoppers 121 provided along the first rail 11, and separated by a predetermined distance. With the stoppers 121 respectively restricting the movement of the front and rear guiding rods C1 of the cart C within the first rail 11, the cart C can be held at a predetermined position between the two stoppers 121. Thus, the distance between the two stoppers 121 is determined based on the distance between the front and rear guiding rods C1 of the cart C. By way of example, each stopper 121 has one end thereof fixed on a side of the groove of the first rail 11, so that the stopper 121 is pivotable between a position parallel to the first direction and another position parallel to the third direction. When the stopper 121 is rotated to be parallel to the third direction, the other end of the stopper 121 can be locked at this position through, for example, a hasp. In this condition, the stopper 121 spans above the groove to prevent the guiding rod(s) C1 accommodated within the groove from passing. The configuration of the stopper 121 is not so limited, as long as it is switchable between states of "allowing the movement of the cart C on the first rail 11" and "preventing the movement of the cart C on the first rail 11". In addition, each of the stoppers 121 may further include cushioning and anti-vibration materials, such as rubber, on at least a surface thereof in contact with the guiding rods C1, in order to reduce vibration generated when the stoppers 121 collide with the guiding rods C1.

Figure 3A:
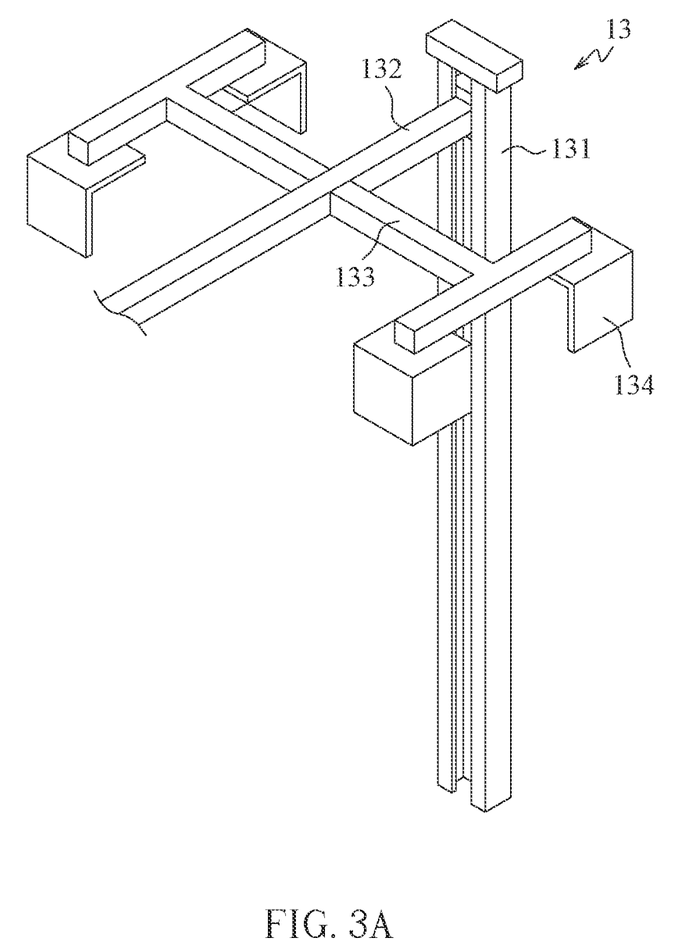
FIG. 3A is a schematic diagram of a liftable holder.
Figure 3B:
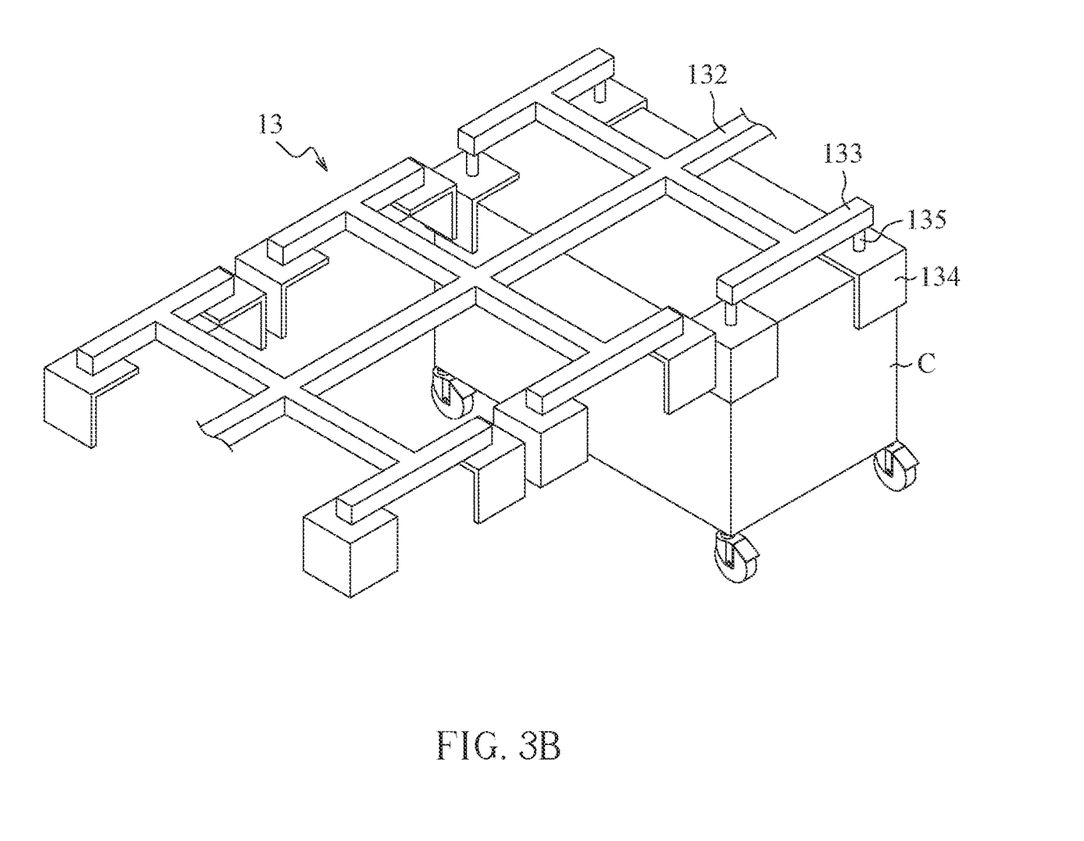
FIG. 3B is a schematic diagram illustrating holding a cart with the liftable holder.

The cargo box body 10 further comprises at least one liftable holder 13 (with reference to FIG. 1). As shown in FIG. 3A, the liftable holder 13 comprises lift rods 131 provided on both laterally opposite sides of an area in which the first rail 11 is disposed (only one lateral side is illustrated in FIG. 1 and FIG. 3A) and extending in the second direction. A connecting rod 132 is connected between the lift rods 131 on both sides. As viewed from the top, the connecting rod 132 of the liftable holder 13 spans the area in which the first rail 11 is disposed (referring to FIG. 1), and is movable on the second direction via the lift rods 131. At least one branch portion 133 is disposed on the connecting rod 132. The branch portion 133 is connected to the connecting rod 132 and moves up and down together with the connecting rod 132. For example, the branch portion 133 is configured to correspond to a predetermined position on the first rail 11 for holding the cart C. As shown in FIG. 3B, when the cart C is held at the predetermined position, the branch portion 133 extends toward the four corners of the top surface of the cart C, as viewed from the top, to form an "H" shape. However, the shape of the branch portion 133 is not limited thereto, and other shapes may also be used.

The liftable holder 13 further comprises at least one holding portion 134 connected to the branch portion 133. For example, as shown in FIG. 3B, holding portions 134 are disposed respectively at locations on the branch portion 133 corresponding to the four corners of the cart C. In other words, the four holding portions 134 are installed on the branch portion 133 in a symmetrical manner with respect to the connecting rod 132. The holding portions 134 hold the cart C from above by coming into contact with the top surface of the cart C as the branch portion 133 is lowered. For example, when the branch portion 133 is lowered to a height that enables the holding portions 134 to contact the top surface of the cart C, the connecting rod 132 is fixed at this height by the lift rod 131, so as to prevent the branch portion 133 and the holding portions 134 from moving upwards, thereby securing the cart C in place from above. In addition, as shown in FIG. 3B, when contacting the top surface of the cart C, the holding portion 134 may also be configured to contact other surfaces of the cart C for further securing the cart C.

In FIG. 3B, the branch portion 133 further comprises a pressing mechanism 135. The pressing mechanism 135 is configured to force the holding portion 134 to further press downward while contacting the top surface of the cart C, such that the cart C is held more firmly from above. For example, the pressing mechanism 135 comprises a link mechanism and a pull rod (not shown in the figures). The link mechanism is connected to the four holding portions 134 of the branch portion 133. When the pull rod is pulled, the four holding portions 134 are simultaneously forced to press downward via the link mechanism, and are held at a predetermined height. In addition, each of the holding portions 134 may further comprise cushioning and anti-vibration materials, such as rubber, on at least a surface thereof in contact with the cart C, in order to absorb the vibration of the cart C and further secure the cart C, when one or more of the holding portions 134 are in contact with the cart C.

Moreover, in a case that the liftable holder 13 is provided with a plurality of branch portions 133 for securing a plurality of carts C, the pressing mechanisms 135 of the plurality of branch portions 133 may be actuated independently of each other. When a plurality of carts C are held by the liftable holder 13, there may be slight differences between height at which the carts C are held, due to dimensional errors and different degrees of wheel wear. As a result, when the connecting rod 132 is lowered for the holding portions 134 of one of the branch portion 133 to contact the top surface of one of the carts C, there may be a gap between the holding portions 134 of other branch portion(s) 133 and the top surface(s) of other cart(s) C, which are in turn unable to be reliably secured. In this regard, by providing pressing mechanisms 135 and allowing the pressing mechanisms 135 of the plurality of branch portions 133 to be actuated independently of each other, the height of the holding portions 134 of each branch portion 133 can be individually adjusted, for reliably securing the plurality of carts C from above, respectively.

The first rail 11 limits the moving direction of the cart C to the first direction. The safety latches 12 hold the cart C at a predetermined position on the first rail 11. The liftable holder 13 secures the cart C from above. As a result, in the cargo box body 10 of the cargo box 1 according to the present invention, the cart C can be loaded employing the first rail 11, and then reliably secured by the safety latches 12 and the liftable holder 13, thereby reducing the impact of vibration of the cargo box 1 on the cart C carried in the cargo box 1.

Figure 4:
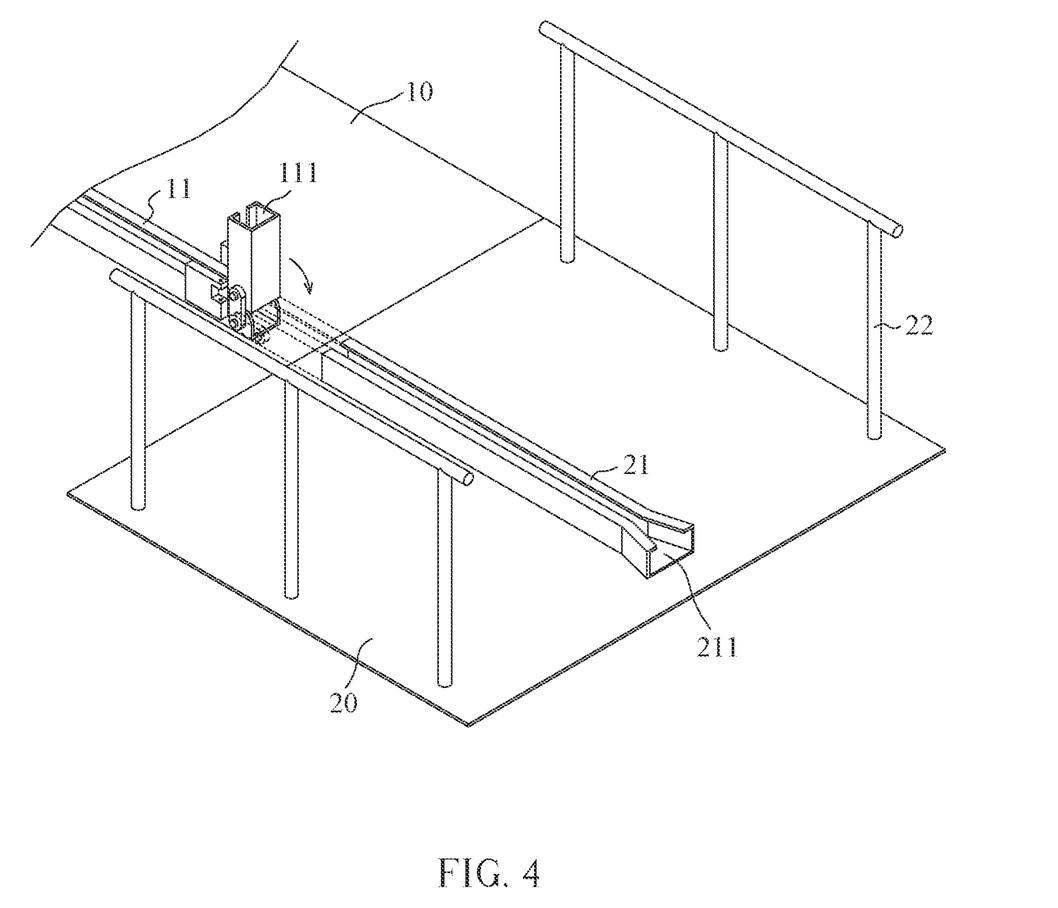
FIG. 4 is a schematic diagram of a cargo box hatch.

Next, the cargo box hatch 20 of the cargo box 1 according to the present invention will be described. The cargo box hatch 20 is disposed on one side of the cargo box body 10, and is connected to the bottom surface of the cargo box body 10. The cargo box hatch 20 can be raised/lowered and opened/closed. For example, as shown in FIG. 4, the cargo box hatch 20 descends outwards when it is opened, and is located at a height that is substantially flush with the bottom of the cargo box body 10. In this manner, an access for cargo to be moved into the cargo box body 10 from the outside or out of the cargo box body 10. Moreover, the cargo box hatch 20 rises when it is closed, so that it located at a position substantially perpendicular to the bottom surface of the cargo box body 10. In this manner, the cargo box hatch 20 and the cargo box body 10 together define the space for accommodating the cart(s) C.

In an aspect of the present invention, the cargo box hatch 20 comprises at least one second rail 21. As shown in FIG. 4, when the cargo box hatch 20 is opened and is at a level substantially flush with the bottom of the cargo box body 10, the second rail 21 extends along the first direction and is aligned with the first rail 11 of the cargo box body 10. Similar to the first rail, the second rail 21 has a groove for accommodating the guiding rods C1, so that the cart C can be moved along the first direction into or out of the cargo box body 10 via the cargo box hatch 20.

In an aspect of the present invention, the first rail 11 further comprises a connector 111 for connecting the first rail 11 and the second rail 21. As shown in FIG. 4, the connector 111 is rotatably connected to one end of the first rail 11. When the cargo box hatch 20 is opened and is located at a height substantially flush with the bottom of the cargo box body 10, the connector is rotated to be parallel to the first rail 11, for connection to one end of the second rail 21. In this manner, the first rail 11 and the second rail 21 are connected. Further, the connector 111 and the second rail 21 are connected, for example, by using fasteners (not shown). Thus, the cart C can be moved into the cargo box body 10 via the second rail 21, the connector 111, and the first rail 11 in sequence. When the cargo box hatch 20 is closed, the connector 111 is rotated to be perpendicular to the first direction in order not to interfere with the cargo box hatch 20.

Furthermore, as shown in FIG. 4, the second rail 21 may further comprise an entrance portion 211. The entrance portion 211 is located at the other end of the second rail 21 which is an end opposite to the end connected to the first rail 11. In other words, the entrance portion 211 is an entrance where the cart C start to engage with the second rail 21. At the end of the second rail 21 (the entrance of the second rail 21) on which the entrance portion 211 is disposed, the entrance portion 211 may be, for example, enlarged outwardly to form a Y-shape. As a result, the guiding rods C1 of the cart C can enter the groove of the second rail 21 more easily through the entrance portion 211 that is wider than the groove of the second rail 21. In addition, rather than using a fastener for connecting the connector 111 to the second rail 21, an additional entrance portion may be provided on a side of the connector 111 where the connector 111 is connected to the second rail 21.

Also, as shown in FIG. 4, the cargo box hatch 20 may further include guardrails 22. The guardrails 22 are arranged on both sides of an area of the cargo box hatch 20 in which the second rail 21 is provided, to prevent the cart C and the personnel carrying the cart C from falling from the cargo box hatch 20. Each of the guardrails 22 may comprise a base portion and a folding portion. For example, the base portion may be configured to be perpendicular to the cargo box hatch 20 and may have a height equal to or slightly higher than the second rail 21. The folding part is connected to the base portion and can be folded toward the area in which the second rail 21 is provided. with such a configuration, the guardrails 22 can be prevented from obstructing the closing of the cargo box hatch 20. In addition, by setting the height of the base portion as mentioned above, the folding portion can be folded over the second rail 21 without colliding with the second rail 21.

In addition to the aforementioned configuration, the cargo box 1 according to the present invention may further comprise a temperature control device (not shown) for controlling the temperature inside the cargo box 1, and a humidity control device (not shown) for controlling the humidity inside the cargo 1. By maintaining the temperature and humidity within the cargo box 1 at suitable temperature and humidity values with the temperature control device and the humidity control device, the impact of the temperature and humidity within the cargo box 1 on the carried cargo can be reduced or eliminated.

Figure 5:
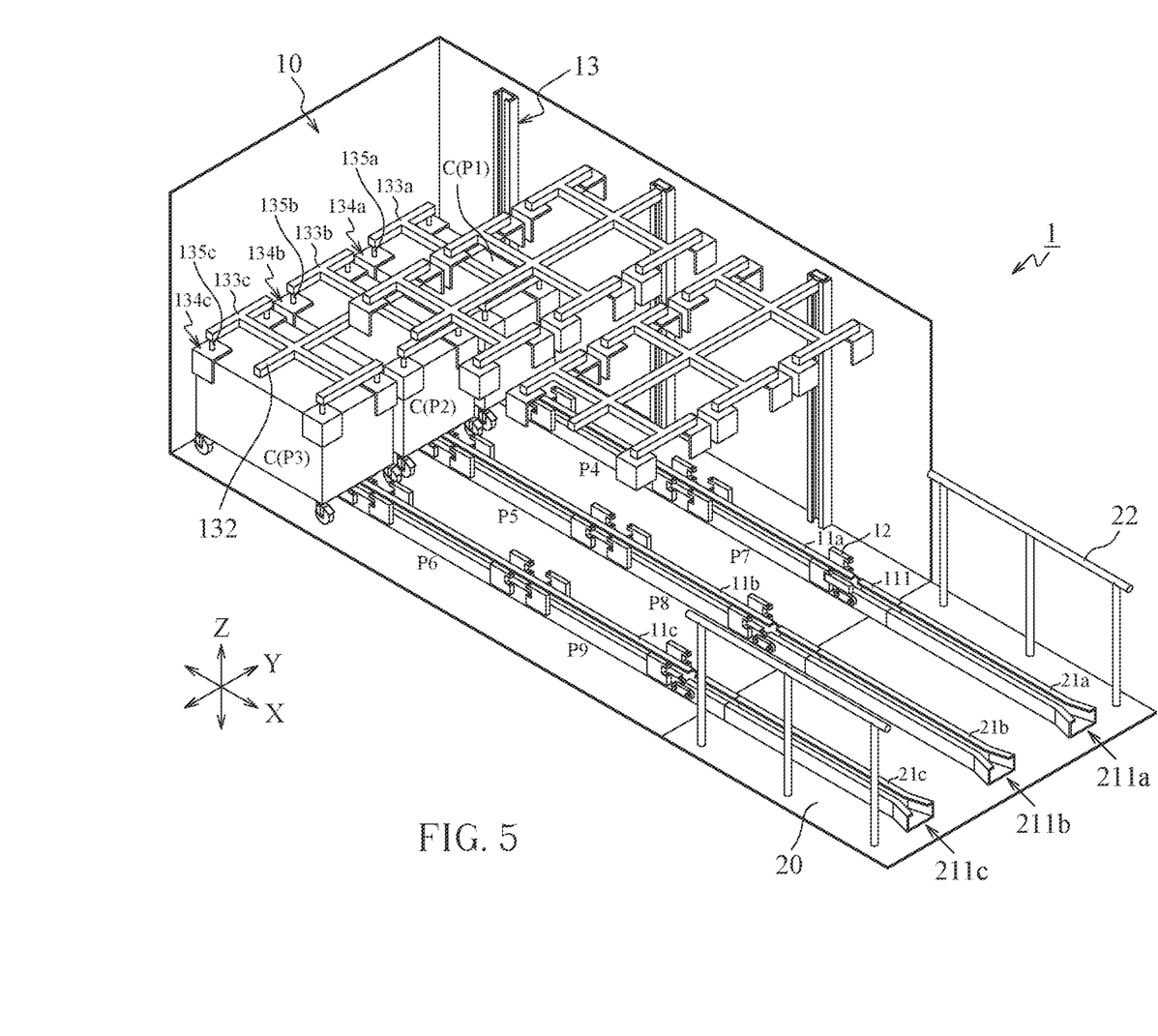
FIG. 5 is a schematic diagram of an example of the cargo box according to the present invention.

Next, an example of loading carts C into the cargo box 1 according to the present invention will be described with reference to FIG. 5. In the example of FIG. 5, the cargo box body 10 is provided with three first rails 11a~11c, where three carts C may be parked at the first rails 11a~11c, respectively. In addition, the first rails 11a~11c comprise respectively three sets of safety latches 12, and in turn, nine parking positions P1~P9 are formed for parking the carts C. Also, three liftable holders 13 are provided along the first direction. Further, three second rails 21a~21c corresponding to the three first rails 11a~11c are provided on the cargo box hatch 20.

First, the cargo box hatch 20 is opened to a position located at a height that is substantially flush with the bottom of the cargo box body 10. Next, the guardrails 22 folded above the second rails 21a~21c are erected, and the connectors 111 are rotated to be parallel to the first direction. Next, a cart C is moved to engage with the second rail 21a, and enter the cargo box body 10 via a corresponding connector 111. The cart C is moved to the parking position P1 along the first rail 11a, and the guiding rods C1 of the cart C are restricted using the safety latches 12, so that the cart C is held at the parking position P1. In the same manner, the other two carts C are moved to the parking positions P2 and P3, respectively, and are restricted with respective safety latches 12. Next, the connecting rod 132 of the liftable holder 13 corresponding to the parking positions P1~P3 is lowered, enabling the holding portions 134a~134c of the branch portions 133a~133c to contact the top surface of the cart C. Then, the carts C are further held respectively with the pressing mechanisms 135a~135c of the branch portions 133a~133c. In this way, the securing of the carts C at the parking positions P1~P3 is accomplished.

In the same manner, the positioning and securing of the carts C at parking positions P4~P6 and P7~P9 is accomplished in the same manner. Then, the connectors 111 are rotated to a position perpendicular to the first direction, followed by folding the guardrails 22 above the second rails 21, and lifting the cargo box hatch for closing the cargo box hatch 20. Hence, the loading of the carts C using the cargo box 1 according to the present invention is completed.

Although the preferred embodiments of the present invention have been described in detail with reference drawings for the purpose of illustration, it is to be understood that the present invention is not limited to those embodiments. Further, various changes and modifications, which may be conceived by those with ordinary skill in the art without departing from the scope of the following claims, are also within the scope of the present invention.

What is claimed is:

1. A cargo box for transporting a cart having guiding rods, comprising:
   a cargo box body configured to accommodate the cart; and
   a cargo box hatch disposed on a side of the cargo box body and connected to a bottom of the cargo box body, the cargo box hatch being able to be raised, lowered, opened, and closed, wherein when opened, the cargo box hatch provides an access for the cart to be moved into and out of the cargo box body,
   wherein the cargo box body comprises:
      a first rail extending along a first direction, the first rail being disposed within the cargo box body and on the bottom of the cargo box body, the first rail being capable of accommodating the guiding rods, such that the cart is movable along the first direction; and
      a liftable holder, comprising:
         lift rods extending in a second direction, the lift rods being disposed on both laterally opposite sides of the first rail;
         a connecting rod connected to the lift rods and being movable upwards and downwards along the lift rods;
         a branch portion disposed on the connecting rod; and one or more holding portions disposed on the branch portion, the one or more holding portions being configured to contact a top surface of the cart when the connecting rod is lowered, wherein the first rail is provided with at least one set of safety latches along the first direction, wherein the at least one set of safety latches include two stoppers configured to hold the cart at a predetermined position on the first rail by restricting movement of the guiding rods along the first rail in the first direction, a spacing between the two stoppers being determined based on a distance between the guiding rods located on front and rear ends of the cart.

2. The cargo box of claim 1, wherein the branch portion further comprises a pressing mechanism configured to force the one or more holding portions to further press downward when contacting the top surface of the cart.

3. The cargo box of claim 2,
wherein the one or more holding portions are a plurality of holding portions installed on the branch portion symmetrically, and
wherein when the plurality of holding portions are forced to press downward by the pressing mechanism, the plurality of holding portions are simultaneously forced to press downward.

4. The cargo box of claim 2, wherein:
the cargo box hatch comprises a second rail configured to extend in the first direction when the cargo box hatch is opened and located at a height substantially flush with the bottom of the cargo box body, and being capable of accommodating the guiding rods, such that the cart is movable along the first direction into or out of the cargo box body via the cargo box hatch,
the first rail further comprises a connector rotatably connected to one end of the first rail,
the second rail is aligned with the first rail when the cargo box hatch is opened and located at the height substantially flush with the bottom of the cargo box body,
the connector is rotated to be parallel to the first direction for connection to one end of the second rail when the cargo box hatch is opened and located at the height substantially flush with the bottom of the cargo box body, and
the connector is rotated to be perpendicular to the first direction when the cargo box hatch is closed and perpendicular to the bottom of the cargo box body, in order not to interfere with the cargo box hatch.

5. The cargo box of claim 4, wherein the second rail comprises an entrance portion, the entrance portion being disposed at another end of the second rail that is opposite to the one end of the second rail, and being enlarged from the another end toward an opposite direction to the one end of the second rail.

6. The cargo box of claim 4, wherein the cargo box hatch further comprises guardrails rotatably disposed on both laterally opposite sides of the second rail.

7. The cargo box of claim 2, wherein:
the stoppers comprise cushioning and anti-vibration materials on a surface thereof in contact with the guiding rods, and
the one or more holding portions comprise cushioning and anti-vibration materials on a surface thereof in contact with at least the top surface of the cart.

8. The cargo box of claim 2, further comprising:
a temperature control device configured to control a temperature inside the cargo box; and
a humidity control device configured to control a humidity inside the cargo box.

9. The cargo box of claim 1, wherein:
the cargo box hatch comprises a second rail configured to extend in the first direction when the cargo box hatch is opened and located at a height substantially flush with the bottom of the cargo box body, and being capable of accommodating the guiding rods, such that the cart is movable along the first direction into or out of the cargo box body via the cargo box hatch,
the first rail further comprises a connector rotatably connected to one end of the first rail,
the second rail is aligned with the first rail when the cargo box hatch is opened and located at the height substantially flush with the bottom of the cargo box body,
the connector is rotated to be parallel to the first direction for connection to one end of the second rail when the cargo box hatch is opened and located at the height substantially flush with the bottom of the cargo box body, and
the connector is rotated to be perpendicular to the first direction when the cargo box hatch is closed and perpendicular to the bottom of the cargo box body, in order not to interfere with the cargo box hatch.

10. The cargo box of claim 9, wherein the second rail comprises an entrance portion, the entrance portion being disposed at another end of the second rail that is opposite to the one end of the second rail, and being enlarged from the another end toward an opposite direction to the one end of the second rail.

11. The cargo box of claim 9, wherein the cargo box hatch further comprises guardrails rotatably disposed on both laterally opposite sides of the second rail.

12. The cargo box of claim 1, wherein:
the stoppers comprise cushioning and anti-vibration materials on a surface thereof in contact with the guiding rods, and
the one or more holding portions comprise cushioning and anti-vibration materials on a surface thereof in contact with at least the top surface of the cart.

13. The cargo box of claim 1, further comprising:
a temperature control device configured to control a temperature inside the cargo box; and
a humidity control device configured to control a humidity inside the cargo box.

* * * * *